(12) United States Patent
Galvin et al.

(10) Patent No.: US 11,481,397 B1
(45) Date of Patent: Oct. 25, 2022

(54) AGGREGATING AND EMITTING DATABASE ACTIVITY RECORD BATCHES

(71) Applicant: Amazon Technologies, Inc., Seattle, WA (US)

(72) Inventors: Timothy Michael Galvin, Edmonds, WA (US); Shawn McCoy, Puyallup, WA (US); David Charles Wein, Shoreline, WA (US); Michael Hall, Seattle, WA (US); Khaled Sinno, Seattle, WA (US); Grant A. McAlister, Morro Bay, CA (US); Tanmoy Dutta, Sammamish, WA (US); Dennis Tighe, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 866 days.

(21) Appl. No.: 16/356,335

(22) Filed: Mar. 18, 2019

(51) Int. Cl.
  *H04L 9/40* (2022.01)
  *G06F 16/2455* (2019.01)
  *G06F 9/54* (2006.01)

(52) U.S. Cl.
  CPC ........ *G06F 16/24556* (2019.01); *G06F 9/547* (2013.01); *H04L 63/20* (2013.01)

(58) Field of Classification Search
  CPC ................................. G06F 9/547; H04L 63/20
  USPC ............................................................ 726/1
  See application file for complete search history.

(56) References Cited

U.S. PATENT DOCUMENTS

| | | | |
|---|---|---|---|
| 2017/0024408 A1* | 1/2017 | Foley | ...................... G06F 21/62 |
| 2017/0180133 A1* | 6/2017 | Kumar | .................. H04L 9/3297 |

* cited by examiner

*Primary Examiner* — Anthony D Brown
(74) *Attorney, Agent, or Firm* — Nicholson De Vos Webster & Elliott LLP

(57) ABSTRACT

Techniques for aggregating and emitting database activity record batches are described. Database activity records can be written to a shared memory queue and emitted to a destination using a remote procedure call (RPC). Individual database connection server processes can write client activity records to the queue. An activity monitor plugin in the database engine can monitor the audit records and aggregate the audit records into batches. Batches of audit records can be sent via RPC to their final or intermediate destination. Each instance host in a database service can include a client backend process configured to define how to submit audit records to shared memory. The activity monitor plugin can batch audit records in to messages and submit those messages via RPC to a security host manager and relaying response back to each relevant client backend.

20 Claims, 9 Drawing Sheets

```
{
  "logTime": "2018-12-04 01:56:00.012005+00",
  "statementId": 1,
  "substatementId": 1,
  "objectType": null,
  "command": "CONNECT",
  "objectName": null,
  "databaseName": "postgres",
  "dbUserName": "rdsadmin",
  "remoteHost": "localhost",
  "remotePort": "36628",
  "sessionId": "5c05deb0.3d7",
  "rowCount": null,
  "commandText": null,
  "paramList": [],
  "sqlHash": null,
  "pid": 983,
  "clientApplication": "psql",
  "exitCode": null,
  "class": "MISC"
}
```
⎯ 300

```
{
  "logTime": "2018-12-04 01:56:17.419057+00",
  "statementId": 2,
  "substatementId": 1,
  "objectType": null,
  "command": "CREATE TABLE",
  "objectName": null,
  "databaseName": "postgres",
  "dbUserName": "rdsadmin",
  "remoteHost": "localhost",
  "remotePort": "36628",
  "sessionId": "5c05deb0.3d7",
  "rowCount": null,
  "commandText": "create table foo (id int, data text);",
  "paramList": [],
  "sqlHash": null,
  "pid": 983,
  "clientApplication": "psql",
  "exitCode": null,
  "class": "DDL"
}
```
⎯ 302

*FIG. 3*

```
{
  "logTime": "2018-12-04 01:57:00.404212+00",
  "statementId": 3,
  "substatementId": 1,
  "objectType": null,
  "command": "PREPARE",
  "objectName": null,
  "databaseName": "postgres",
  "dbUserName": "rdsadmin",
  "remoteHost": "localhost",
  "remotePort": "36628",
  "sessionId": "5c05deb0.3d7",
  "rowCount": null,
  "commandText": "prepare foo_insert (int, text) as insert into foo (id,data) values ($1,$2);",
  "paramList": [],
  "sqlHash": null,
  "pid": 983,
  "clientApplication": "psql",
  "exitCode": null,
  "class": "WRITE"
}
```
400

```
{
  "logTime": "2018-12-04 01:57:26.94381+00",
  "statementId": 4,
  "substatementId": 1,
  "objectType": "TABLE",
  "command": "INSERT",
  "objectName": "public.foo",
  "databaseName": "postgres",
  "dbUserName": "rdsadmin",
  "remoteHost": "localhost",
  "remotePort": "36628",
  "sessionId": "5c05deb0.3d7",
  "rowCount": 1,
  "commandText": "prepare foo_insert (int, text) as insert into foo (id,data) values ($1,$2);",
  "paramList": [
    "10",
    "testing, testing"
  ],
  "sqlHash": 0,
  "pid": 983,
  "clientApplication": "psql",
  "exitCode": null,
  "class": "WRITE"
}
```
402

```
{
  "logTime": "2018-12-04 01:57:26.945581+00",
  "statementId": 4,
  "substatementId": 2,
  "objectType": null,
  "command": "EXECUTE",
  "objectName": null,
  "databaseName": "postgres",
  "dbUserName": "rdsadmin",
  "remoteHost": "localhost",
  "remotePort": "36628",
  "sessionId": "5c05deb0.3d7",
  "rowCount": null,
  "commandText": "execute foo_insert(10, testing, testing);",
  "paramList": [],
  "sqlHash": null,
  "pid": 983,
  "clientApplication": "psql",
  "exitCode": null,
  "class": "MISC"
}
```

502

```
{
  "logTime": "2018-12-04 01:57:40.410288+00",
  "statementId": 5,
  "substatementId": 1,
  "objectType": null,
  "command": "DISCONNECT",
  "objectName": null,
  "databaseName": "postgres",
  "dbUserName": "rdsadmin",
  "remoteHost": "localhost",
  "remotePort": "36628",
  "sessionId": "5c05deb0.3d7",
  "rowCount": null,
  "commandText": null,
  "paramList": [],
  "sqlHash": null,
  "pid": 983,
  "clientApplication": "psql",
  "exitCode": 0,
  "class": "MISC"
}
```

*FIG. 5*

AGGREGATING AND EMITTING DATABASE ACTIVITY RECORD BATCHES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource. Additionally, database services can provide a scalable and highly available database to various users.

BRIEF DESCRIPTION OF DRAWINGS

Various embodiments in accordance with the present disclosure will be described with reference to the drawings, in which:

FIGS. 3-5 show example audit records according to some embodiments.

DETAILED DESCRIPTION

Various embodiments of methods, apparatus, systems, and non-transitory computer-readable storage media for aggregating and emitting database activity record batches are described. Embodiments provide improved auditing of database activity in a database service. A database service may include multiple database instance hosts, each with a database engine. To effectively audit activity across the various instance hosts of the database service, an activity monitor plugin can be added to each database engine, enabling various activities (e.g., logging on/off, running queries, data manipulation language (DML)/data definition language (DDL) calls, updates to parameters, database administrator actions, etc.) to be monitored and preventing privileged users from modifying what is being monitored.

According to some embodiments, database activity records can be written to a shared memory queue and emitted to a destination using a remote procedure call (RPC). Individual database connection server processes can write client activity records to the queue. An activity monitor plugin in the database engine can monitor the audit records and aggregate the audit records into batches. Batches of audit records can be sent via RPC to their final or intermediate destination. Each instance host in a database service can include a client backend process configured to define how to submit audit records to shared memory. The activity monitor plugin can batch audit records in to messages and submit those messages via RPC to a security host manager and relaying response back to each relevant client backend.

Figure 1:
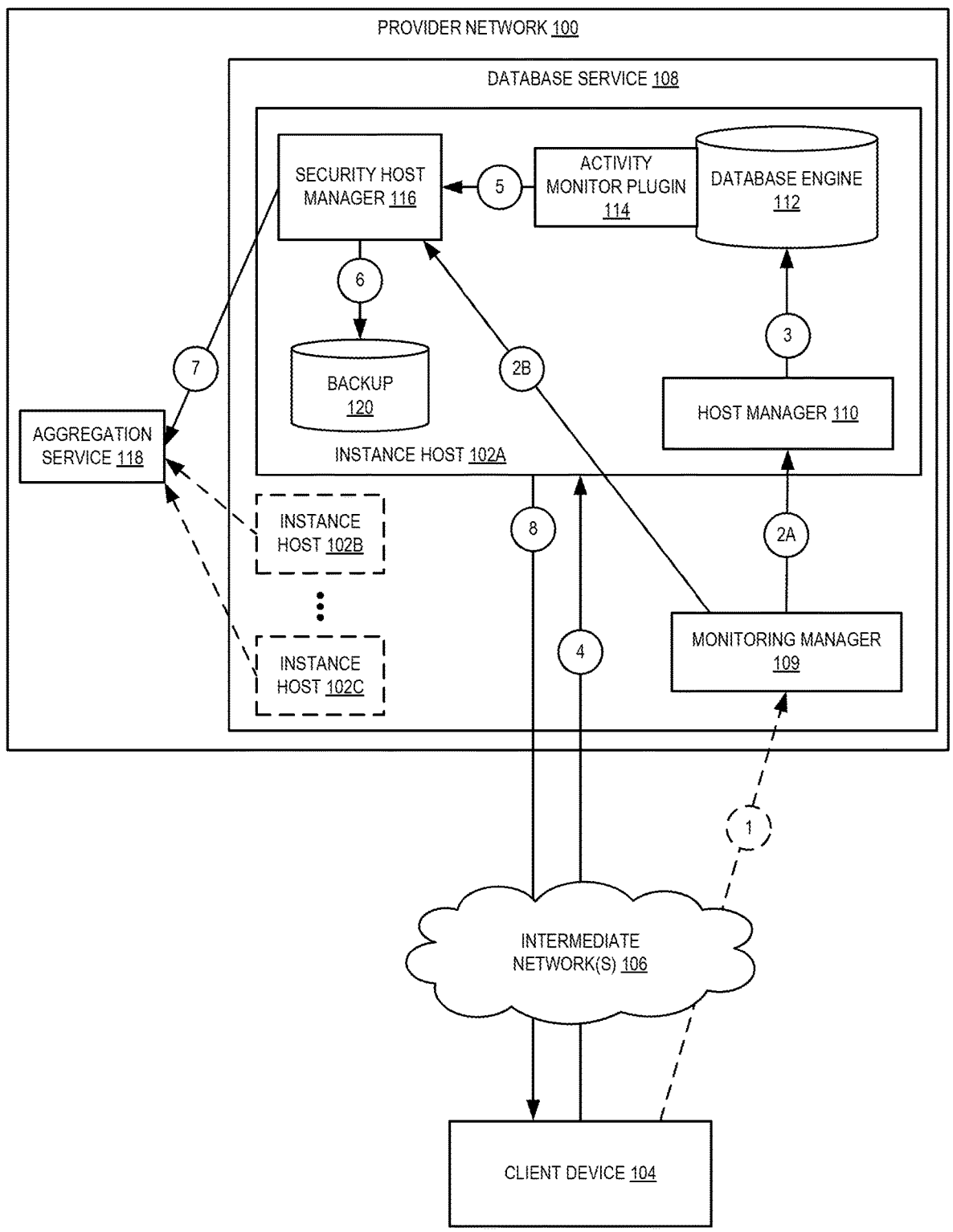
FIG. 1 is a diagram illustrating an environment for aggregating and emitting database activity record batches according to some embodiments.

FIG. 1 is a diagram illustrating an environment for aggregating and emitting database activity record batches according to some embodiments. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As shown in FIG. 1, a provider network 100 can include a database service 108. Database service 108 may provide a relational database (or other database) to customers which can be accessed over one or more intermediate networks 106. The relational database can be implemented on one or more instance hosts 102A-102C, enabling the database to scale with demand (e.g., by adding or removing instance hosts from the database service). Each instance host can implement one of a plurality of database engines (e.g., PostgresSQL, MySQL, SQL Server, etc.). As shown at numeral 1, optionally, a user can send a request to a monitoring manager 109 in database service 108 to begin auditing activity in their instance hosts 120A-102C. For example, a customer may choose to audit all or a portion of their instance hosts, which may correspond to one or more databases implemented in database service 108. In some embodiments, selecting whether the database is audited may be done during setup of the database.

Monitoring manager 109 can instruct host manager 110, at numeral 2A, on instance host 102A to begin auditing database engine 112. This may be in the form of an application programming interface (API) call or other message. At numeral 3, host manager 110 can configure database engine 112 to begin recording events. This configuration can include identifying a region of shared memory to which to store the events and/or event structure, such as indicating which parameters are to be recorded for each event and event format (e.g., JSON or other format).

In some embodiments, monitoring manger 109 can also configure security host manager 116. Such configuration may include providing storage instructions for the audit records (e.g., a storage location, credentials to access the storage location, etc.) and/or instructions to output the audit records to the aggregation service 118. In some embodiments, monitoring manager 109 can manage security credentials maintained by the security host manager and used to encrypt/decrypt the audit records and/or portions of an audit record. For example, the monitoring manager can manage encryption certificates to ensure the security manager has a valid encryption certificate available to perform encryption and decryption.

After auditing has been enabled, when the instance host 102A receives requests from users, such as administrative actions, queries from customers, etc., the database engine 112 can generate events according to the configured event structure. For example, at numeral 4, a query can be received by the instance host 102A from a client device 104. A client backend process associated with that client device can process the query. Additionally, the client backend process can generate an audit record that represents the query. This may include an identifier associated with the requestor, a timestamp, connection information, a hash of the command being executed, and/or other information based on the configuration of the database engine. The client backend process can pass the audit record to a region of shared memory allocated by the database engine. Although a single client device is shown in the embodiment of FIG. 1, in various embodiments an instance host may connect to a plurality of client devices simultaneously, each having an associated client backend process in database engine 112. Each client backend process can add audit records to the same region of shared memory being monitored by activity monitor plugin 114. Although embodiments are described with respect to a process-based database engine, embodiments may be similarly implemented in thread-based database engines. For example, a new thread may be started when a client device connects to the database to process a query or queries for the client device. The thread can then perform the actions described above with respect to the client backend process.

Activity monitor plugin 114 can monitor the region of shared memory and can prepare a batch of audit records to be passed to the security host manager 116 once enough records have accumulated based on one or more batch limits. For example, a batch of audit records can be prepared if a configurable amount of time has elapsed since the last batch was sent, or if the region of shared memory includes a configurable number of audit records, or if the size of the batch reaches a configurable size (e.g., in bytes, kilobytes, etc.). In some embodiments, the batch limits can be defined and/or modified by the user. For example, default batch size, time limit, etc. can be provided by the database service and the values for one or more of the limits can be modified by the user. At numeral 5, once the activity monitor plugin 114 determines that one of the batch limits has been reached, the activity monitor plugin can send the batch of audit records to the security host manager 116. The security host manager receives the audit data from the plugin 114 and then at numeral 6 persists the data in a durable storage location, such as backup data store 120.

In some embodiments, the backup storage location can be the same database 112 which is being audited. By using the same database to store the audit records, the storage location will be available at the same time as the database is available (e.g., the audit storage location cannot fail independently of the database being audited). In some embodiments, the use can configure how much of the database storage capacity is made available to store audit records. In some embodiments, the backup storage location can be provided by a storage service, such as a block storage service or other storage service that utilizes one or more hard drives on instance host 102A or on another instance associated with instance host 102A. In some embodiments, the backup storage location can be maintained in-memory. This eliminates any additional dependencies on storage service and provides faster storage of the audit records.

In some embodiments, the security host manager 116 can provide the audit records to an aggregation service 118, as shown at numeral 7. The aggregation service can receive a data stream of audit records from the security host managers on one or more of the host instances 102A-102C. In some embodiments, the aggregation service can process the audit data and provide the processed audit data to one or more applications, such as an analytics application, a dashboard or other user interface application, etc. The aggregation service can process the audit data based on the parameters included in the audit records in the data stream. For example, the aggregation service can output audit records corresponding to particular event types to particular applications, generate alerts or other messages based on the audit records in the data stream, etc.

Figure 2:
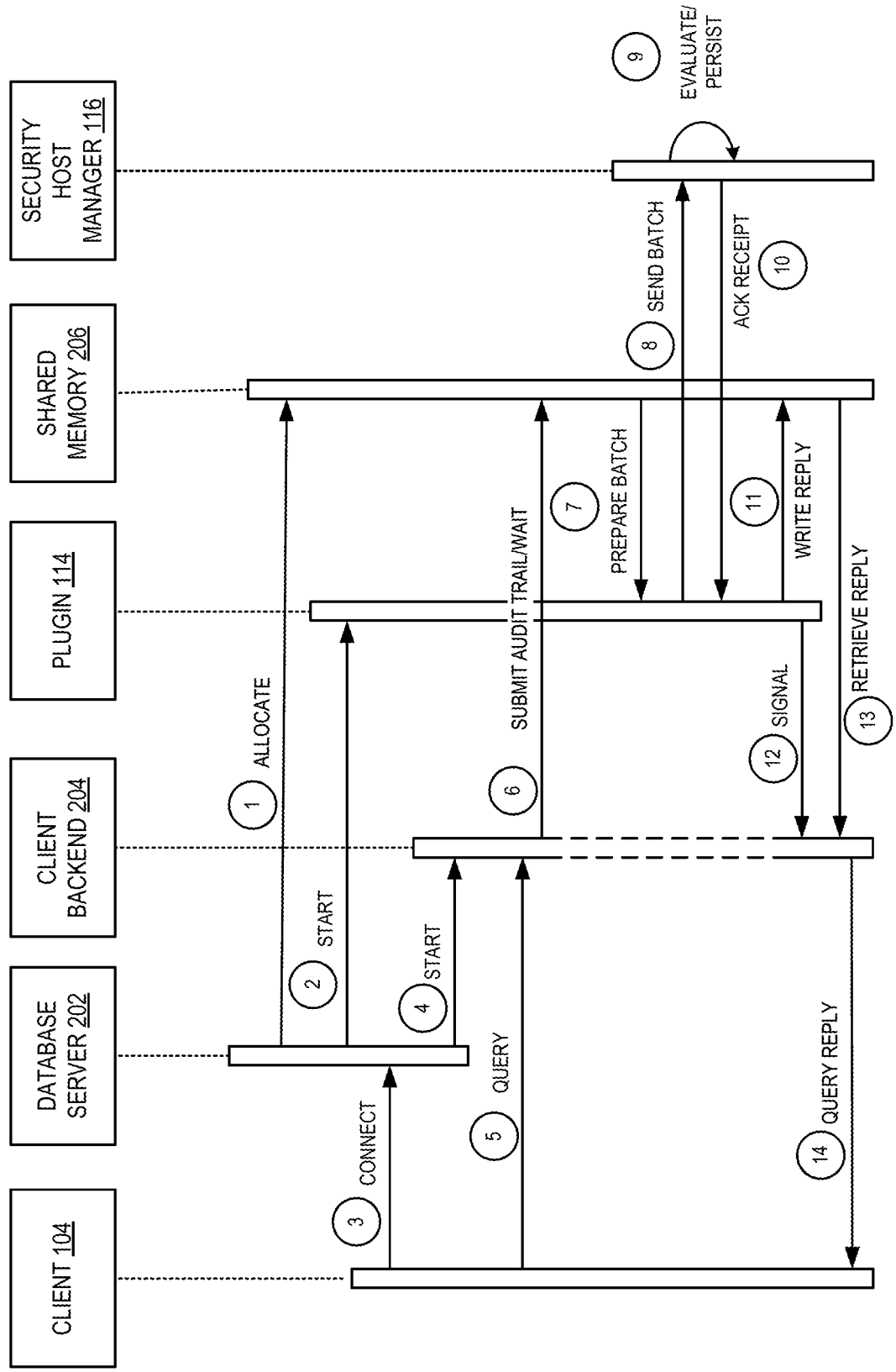
FIG. 2 is a sequence diagram illustrating aggregating and emitting database activity record batches according to some embodiments.

FIG. 2 is a sequence diagram illustrating aggregating and emitting database activity record batches according to some embodiments. In the example shown in FIG. 2, auditing has been enabled on the database by the host manager. As discussed, the host manager can enable auditing by configuring the database to begin recording auditing events, including identifying a region of shared memory 206 to which to store the events and/or event structure, such as indicating which parameters are to be recorded for each event and event format (e.g., JSON or other format). In some embodiments, the host manager can configure the database to begin auditing activity in response to an instruction from the database service and/or customer. The instruction may be received via an API call, console, or other interface.

As shown in FIG. 2, at numeral 1, a database server (e.g., top level process, etc.) 202 of the database engine can allocate a region of shared memory 206 to store audit records. In some embodiments, the region of shared memory may include a shared queue or ring buffer into which audit records are stored. Allocation of the region of shared memory can be performed during startup of the database engine. In some embodiments, after the database engine is configured to begin auditing activity, the database engine can be restarted and perform allocation upon restart. At numeral 2, the database server 202 can start the activity monitor plugin 114 to manage the shared memory 206 and to prepare batches and send batches to the security host manager 116. By using batches, the overhead associated with transmitting audit records can be spread out over multiple audit records, improving the performance of the database service. Additionally, the use of batches improves performance on the parsing of the audit records by the security host manager and saves time from serializing/deserializing the audit data.

At numeral 3, a client device 104 can connect to the database. At numeral 4, the database server 202 can start a client backend (e.g., a client backend process, thread, etc.) for the client device. The client backend can then accept queries from the client device 104. This client backend is preloaded with a shared library that can be used to access to the shared memory 206. At numeral 5, the client device submits a SQL query to the client backend 204. The client backend builds a data structure representing audit data for the query at numeral 6. In some embodiments, the client backend also processes the query in the database. In some embodiments, the client backend can wait to process the query in the database until the audit data for the activity has been approved. Before returning to the client 104, the client backend 204 publishes the audit record to the shared memory 206. In some embodiments, the audit record includes a pointer to a location in the shared memory that the client backend uses to wait for reply on before returning to the client. In some embodiments, the client backend can set a time to live (TTL) or other deadline for each audit record when it is added to the shared memory. The TTL may include a timestamp corresponding to a time when the record is to expire out of the shared memory. The client backend can monitor the current time relative to the TTL.

As discussed, the shared memory 206 can receive audit records from a plurality of client backends corresponding to a plurality of client devices connected to the instance host of the database. The activity monitor plugin 114 can monitor the shared memory 206 and, if a batch limit has been reached, then at numeral 7, the plugin 114 can prepare a batch of audit records. At numeral 8, the batch is then submitted to the security host manager 116 running on the instance host. In some embodiments, the batch is submitted via RPC. At numeral 9, the security host manager processes the audit records in the batch of audit records. Processing may include storing the audit records to the database, in-memory, or to another storage location, as described above. Additionally, or alternatively, the security host manager 116 can provide the audit records to an aggregation service. In some embodiments, the batch can be prepared using protocol buggers or other message format.

At numeral 10, for each member in the batch, the plugin 114 receives an ALLOW/REJECT/ERROR response from the security host manager 116. In some embodiments, the security host manager can respond with a success/fail response indicating whether the audit record has been successfully stored. If there is a timeout (e.g., the TTL elapses before the security host manager responds) the client backend can reply to the client device. In some embodiments, if an acknowledgement has not been received and the TTL has not expired, the plugin can retry sending the batch. In some embodiments, the security host manager can encrypt the audit records prior to storing them. At numeral 11, the plugin can write a reply to a location in shared memory. As discussed, the location in shared memory can be used to instruct the client backend to continue processing the query and return the query results to the client device. For example, the location in shared memory may store a value which may indicate, e.g., whether to continue processing, whether an error has occurred, or other processing status value. At numeral 12, the plugin 114 can respond to each client backend 204 indicating that the location in shared memory has been updated. At numeral 13, the client backend can retrieve the processing status value from the location in shared memory. This allows each client backend to evaluate the response and continue with query execution appropriately. For example, if the value indicates that the audit record has been successfully stored, the client backend can continue processing the query. In some embodiments, rather than storing the processing status value at a location in the shared memory, the plugin can directly notify each client backend that processing may resume (or that an error has been detected, or other processing status information). In some embodiments, the shared memory can be locked by the plugin while a batch is prepared, and the lock may be removed once the batch has been confirmed to have been stored to a durable location. At numeral 14, the query reply can be returned to the client device 104.

In various embodiments, the plugin 114 and/or security host manager 116 can maintain health metrics for the auditing system. The health metrics may include network performance metrics for the RPC connection (e.g., how long are the roundtrips taking to store the audit records), outage detection and corresponding timestamps, storage availability for the audit records (e.g., is there sufficient storage capacity in the storage location, is the storage location available, etc.), aggregation service availability, etc. In some embodiments, if an outage is detected, a notification can be returned to the client device via the plugin 114 and client backend. In some embodiments, the user can configure the amount of time without a response that is required before an outage is determined.

In some embodiments, auditing may be performed synchronously, in which the client backend service waits for acknowledgement from the security host manager that the audit record has been stored before returning to the client backend. In the synchronous embodiment, the connection can be held open, for example, if the storage location to which the audit records are to be stored fails, or the disk is full. This has the effect of throttling the database, as the client cannot submit another action. In some embodiments, the connection may be held until the audit data can be successfully persisted or until the audit data has been sent to the aggregating service. In some embodiments, audit data can be processed asynchronously. By processing audit data asynchronously, control can be returned to the client device more quickly (e.g., without waiting for confirmation that the audit data has been stored). However, this also risks loss of audit records where there is storage failure. Customers can choose whether auditing is performed synchronously or asynchronously based on their performance demands.

In some embodiments, in addition to database activity, other audit records can be generated. For example, the plugin 114 can be configured to heartbeat, to indicate that auditing is enabled and functioning correctly. The heartbeats may take the form of a timestamp or other data indicating that the plugin 114 is functioning. The heartbeat audit record can be added to the shared memory by the plugin and batched with other audit records before being sent to the security host manager. Additionally, or alternatively, alarm records can be generated if alarm conditions are identified. For example, if particular components go down alarm records can be generated for those components and can be added to the shared memory with the other audit records. In some embodiments, a notification may also be generated and returned to the client device via the client backend service.

In some embodiments, when the plugin 114 determines an batch limit has been reached and a batch is to be prepared, the plugin can obtain a lock on the shared memory to prevent any client backends from adding additional records to it. Once the batch has been sent and stored, the shared memory can be cleared, and the lock can be removed, enabling client processes to added audit records to the shared memory.

FIGS. 3-5 show example audit records according to some embodiments. As shown in FIG. 3, record 300 shows an audit record associated with a database connect action. The audit record can include a timestamp (e.g., logTime), the command being executed (in this example CONNECT). The database name, remote host and remote port, the client application in use, process ID (e.g., pid), the username of the user performing the action (e.g., dbUserName), etc. In various embodiments, audit records may also include a hash of the statement, exit code, a row count, a session ID, or additional or fewer parameters, as may be configured by the customer, database administrator, or other entity. Record 302 corresponds to a create table action. In this example, the CREATE TABLE command is added to the audit record 302 along with the command text associated with the action. As shown in FIG. 4, audit record 400 corresponds to a create a prepared statement action. In this example, the command is PREPARE, and the command text identifies the data to be inserted. Execution of the prepare statement can result in two events. The first event results in audit record 402, which corresponds to the execution of the underlying insert command. The second event results in audit record 500, as shown in FIG. 5. corresponding the execution of the insert command Once the insert command has been executed, one more audit record is generated for the database disconnect, as shown at 502.

In some embodiments, the parameters included in the audit record can only be populated after a query has been executed (e.g., to have a row count the query has already executed and a result identified). In some embodiments, an audit record may be generated before a query is run. Such an audit record may include fewer parameters than one generated after a query has been run. In some embodiments, an audit record can be generated before a query is run and analyzed to determine whether to run the query. For example, the type of command being executed by a particular user may be restricted. If so, the query may be blocked once the audit record is analyzed. In some embodiments, the customer can define rules or actions to be performed based on what events are represented in the audit records. Additionally, or alternatively, the audit records can be analyzed by machine learning algorithms to determine actions to be performed based on the events represented in the audit records.

If the query is not blocked, a new audit record can be generated following execution of the query. In some embodiments, both the pre-execution and post execution audit records can be maintained in the audit data. Alternatively, only the post-execution audit record may be maintained and the pre-execution audit record may be discarded.

Figure 6:
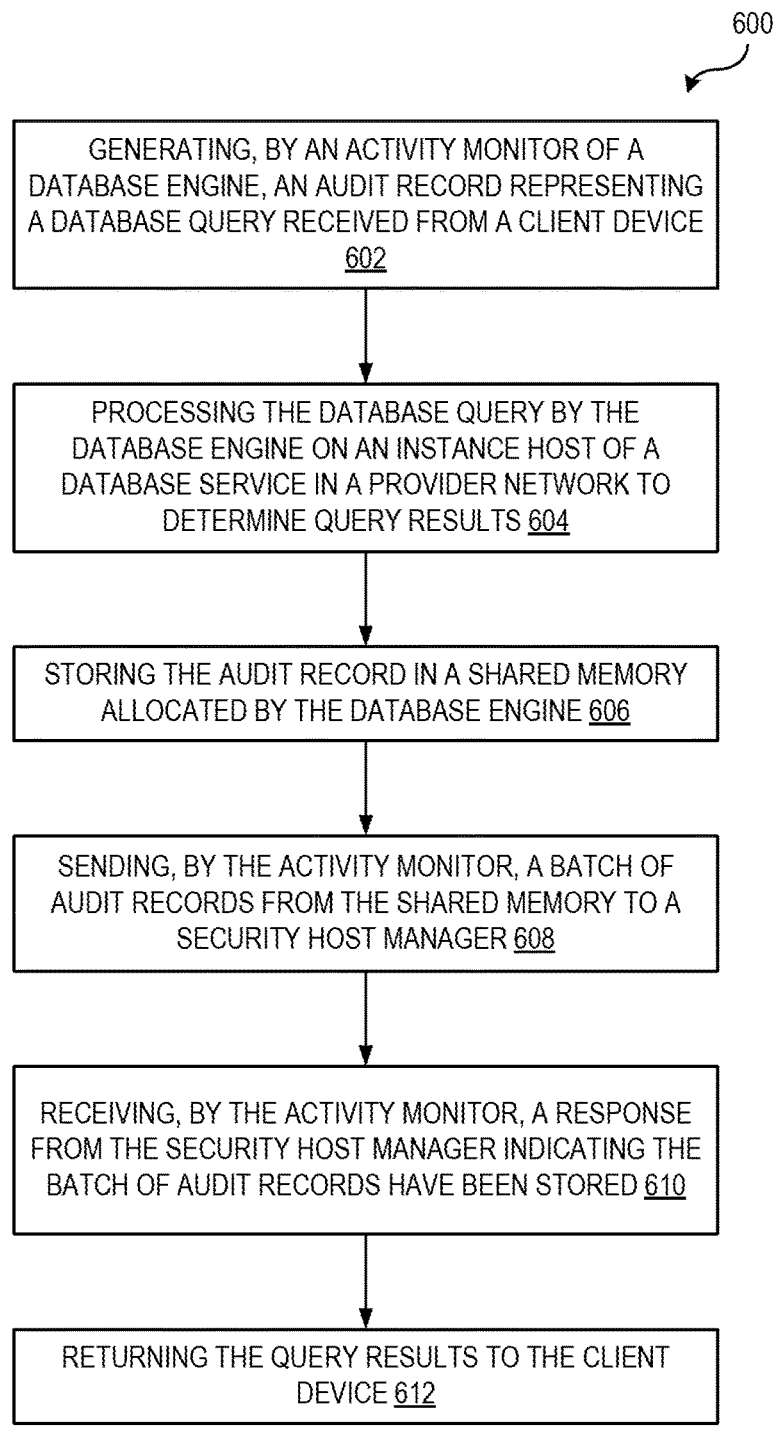
FIG. 6 is a flow diagram illustrating operations of a method for aggregating and emitting database activity record batches according to some embodiments.

FIG. 6 is a flow diagram illustrating operations 600 of a method for aggregating and emitting database activity record batches according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the database service 108, instance host 102A-102C, host manager 110, database engine 112, activity monitor 114, or security host manager 116 of the other figures.

The operations 600 include, at block 602, generating, by an activity monitor of a database engine, an audit record representing a database query received from a client device. The operations 600 include, at block 604, processing the database query by the database engine on an instance host of a database service in a provider network to determine query results. The operations 600 include, at block 606, storing the audit record in a shared memory allocated by the database engine. In some embodiments, the audit record includes one or more of a timestamp, a command being executed, a database name, a client application in use, a process ID, or a username associated with the query.

The operations 600 include, at block 608, sending, by the activity monitor, a batch of audit records from the shared memory to a security host manager. In some embodiments, the batch of audit records is sent to the security host manager using a remote procedure call. In some embodiments, the security host manager stores the audit records in the batch of audit records in a database associated with the database engine. For example, the audit records can be stored in the same database whose activity has generated the audit records. In some embodiments, the audit records can be stored in-memory or in a storage location of a storage service, such as a block storage service, object storage service, etc. In some embodiments, the security host manager outputs an event stream including the audit records to an aggregating service. As discussed, the aggregating service can process out output the audit records as a stream to one or more applications and/or user interfaces.

The operations 600 include, at block 610, receiving, by the activity monitor, a response from the security host manager indicating that the batch of audit records have been stored. The operations 600 include, at block 612, returning the query results to the client device. In some embodiments, query results can be returned to the client device after the response has been received from the security host manager indicating that the batch of audit records have been stored. In some embodiments, query results can be returned to the client device before the response has been received from the security host manager indicating that the batch of audit records have been stored.

In some embodiments, the operations may further include periodically generating, by the activity monitor, a heartbeat record, and storing the heartbeat record in the shared memory, wherein the heartbeat record is included in the match of audit records when it is sent to the security host manager.

In some embodiments, the operations may further include determining that the shared memory has reached a batch limit, preparing the batch of audit records to be sent to the security host manager, and updating a location in the shared memory with a value indicating processing status. In some embodiments, the batch limit includes at least one of a time limit, batch size limit, or record number limit.

In some embodiments, the operations may further include associating a timestamp with the audit record, determining the response has not been received from the security host manager, determining the timestamp has not elapsed, and resending the batch of audit records to the security host manager.

In some embodiments, the operations may include receiving a request to enable auditing of activity received by a database engine on an instance host in a database service in a provider network, configuring the database engine to generate audit records that include a plurality of parameters, allocating a shared memory by the database engine, the shared memory to store audit records from a plurality of client backend processes started by the database engine, starting an activity monitor plugin on the database engine, the activity monitor plugin to monitor the shared memory based on one or more batch limits, receiving a query by the database engine from a client device, generating an audit record representing the query, processing the query, storing the audit record in the shared memory, determining that the shared memory has reached a batch limit, preparing a batch of audit records, sending the batch of audit records to a security host manager, receiving a response from the security host manager indicating the batch of audit records have been stored, and returning the response and query results to the client device.

Figure 7:
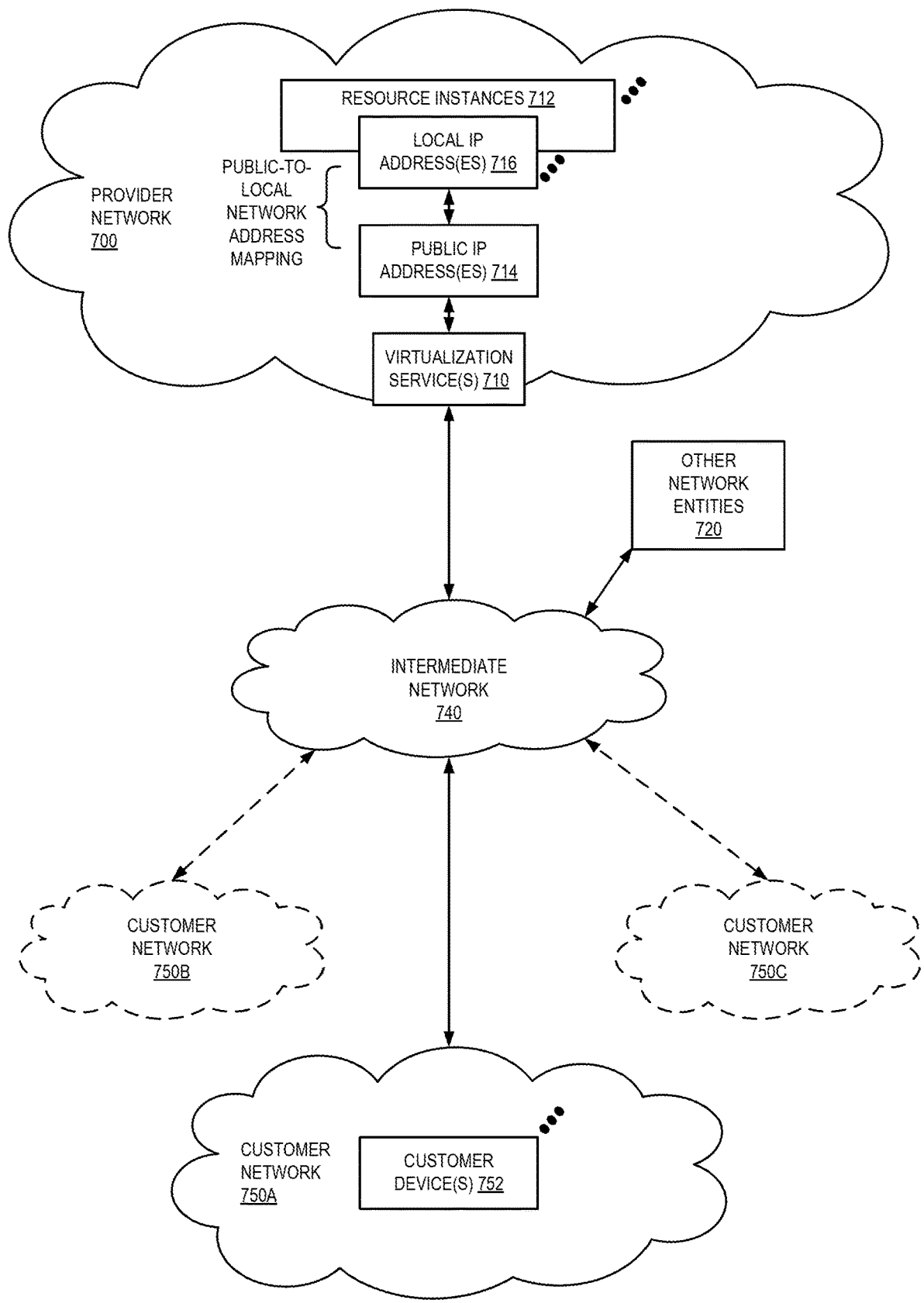
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
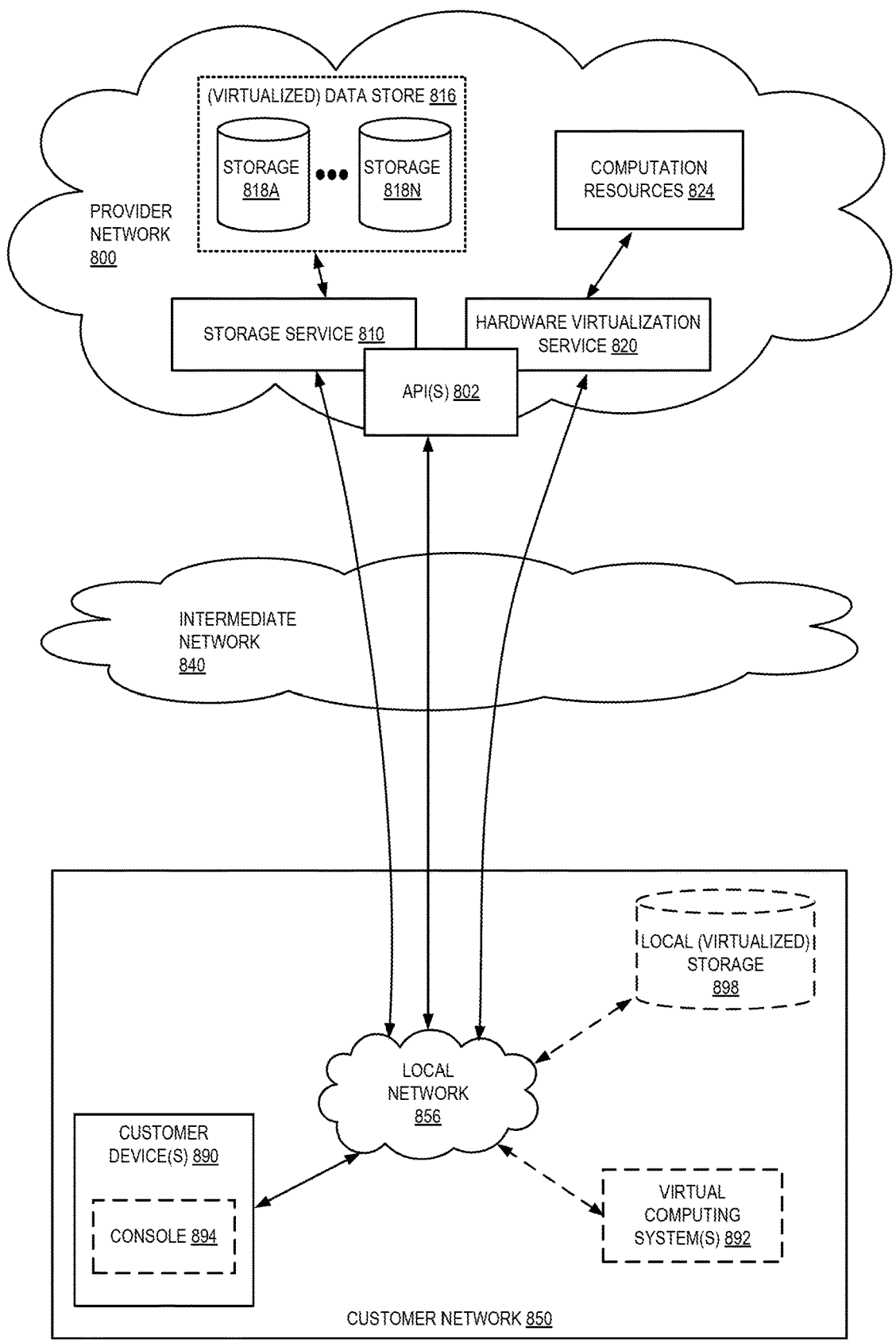
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
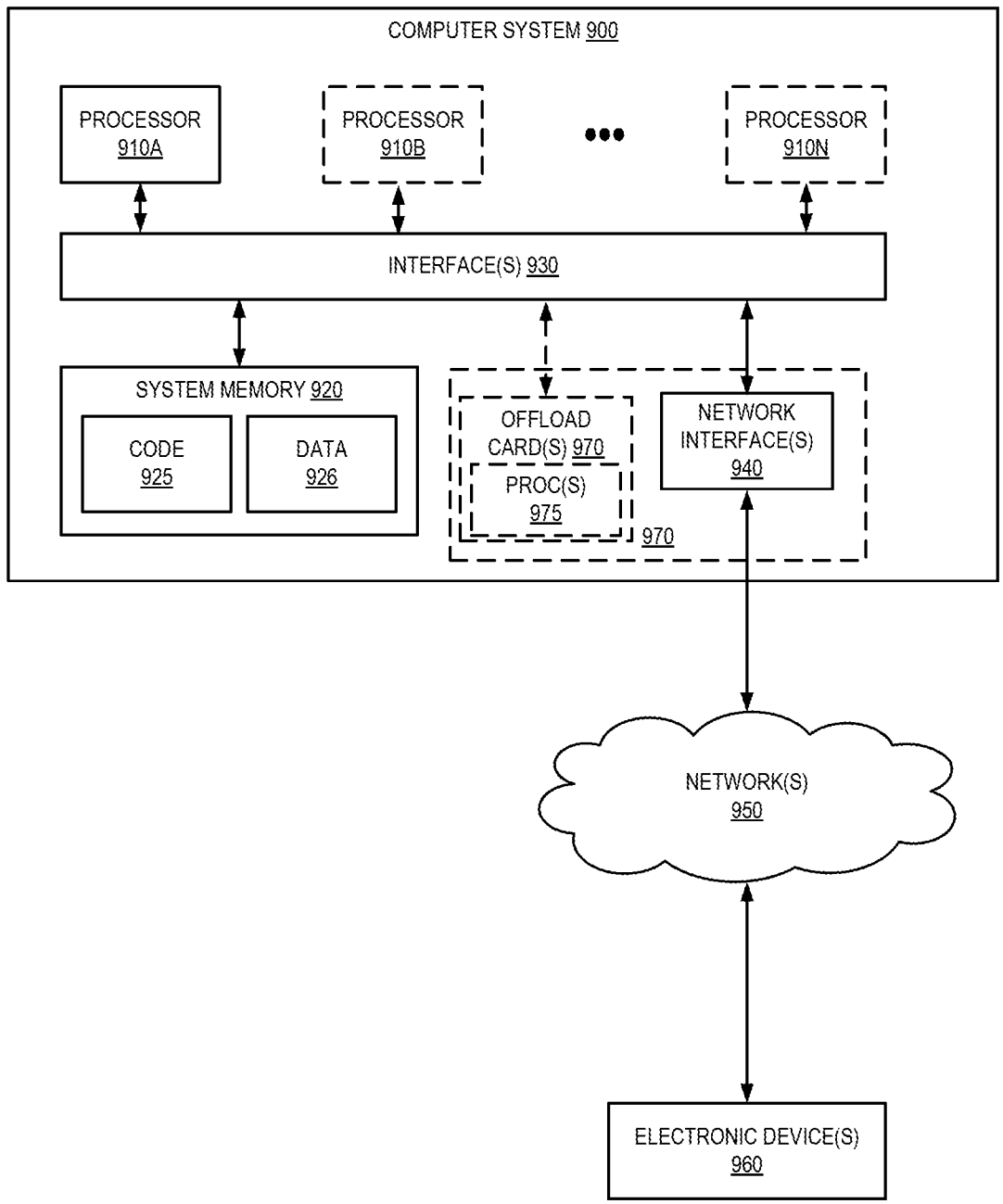
FIG. 9 is a block diagram illustrating an example computer system that may be used in some embodiments.

In some embodiments, a system that implements a portion or all of the techniques for aggregating and emitting database activity record batches as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 102A-102C, 818A-818N, etc.) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to enable auditing of activity received by a database engine on an instance host in a database service in a provider network;
   configuring the database engine to generate audit records that include a plurality of parameters;
   allocating a shared memory by the database engine, the shared memory to store audit records from a plurality of client backend processes started by the database engine;
   starting an activity monitor plugin on the database engine, the activity monitor plugin to monitor the shared memory based on one or more batch limits;
   receiving a query by the database engine from a client device;
   generating an audit record representing the query;
   processing the query;
   storing the audit record in the shared memory;
   determining that the shared memory has reached a batch limit;
   preparing a batch of audit records;
   sending the batch of audit records to a security host manager;
   receiving a response from the security host manager indicating the batch of audit records have been stored; and
   returning the response and query results to the client device.

2. The computer-implemented method of claim 1, wherein one or more batch limits include a time limit, batch size limit, or record number limit.

3. The computer-implemented method of claim 1, wherein the batch of audit records is sent to the security host manager using a remote procedure call.

4. A computer-implemented method comprising:
  generating, by an activity monitor of a database engine, an audit record representing a database query received from a client device;
  processing the database query by the database engine on an instance host of a database service in a provider network to determine query results;
  storing the audit record in a shared memory allocated by the database engine;
  sending, by the activity monitor, a batch of audit records from the shared memory to a security host manager;
  receiving, by the activity monitor, a response from the security host manager indicating that the batch of audit records have been stored; and
  returning the query results to the client device.

5. The computer-implemented method of claim 4, wherein the security host manager stores the audit records in the batch of audit records in a database associated with the database engine.

6. The computer-implemented method of claim 4, wherein returning the query results to the client device further comprises:
  returning the query results to the client device after the response has been received from the security host manager indicating that the batch of audit records have been stored.

7. The computer-implemented method of claim 4, returning the query results to the client device further comprises:
  returning the query results to the client device before the response has been received from the security host manager indicating that the batch of audit records have been stored.

8. The computer-implemented method of claim 4, wherein the security host manager outputs an event stream including the audit records to an aggregating service.

9. The computer-implemented method of claim 4, further comprising:
  periodically generating, by the activity monitor, a heartbeat record; and
  storing the heartbeat record in the shared memory, wherein the heartbeat record is included in the batch of audit records when it is sent to the security host manager.

10. The computer-implemented method of claim 4, further comprising:
  determining that the shared memory has reached a batch limit;
  preparing the batch of audit records to be sent to the security host manager; and
  updating a location in the shared memory with a value indicating processing status.

11. The computer-implemented method of claim 10, wherein the batch limit includes at least one of a time limit, batch size limit, or record number limit.

12. The computer-implemented method of claim 4, further comprising:
  associating a timestamp with the audit record;
  determining the response has not been received from the security host manager;
  determining the timestamp has not elapsed; and
  resending the batch of audit records to the security host manager.

13. A system comprising:
  an aggregation service implemented by a first one or more electronic devices; and
  a database service implemented by a second one or more electronic devices, the database service including instructions that upon execution cause the database service to:
    generate, by an activity monitor of a database engine, an audit record representing a database query received from a client device;
    process the database query by the database engine on an instance host of a database service in a provider network to determine query results;
    store the audit record in a shared memory allocated by the database engine;
    send, by the activity monitor, a batch of audit records from the shared memory to a security host manager;
    receive, by the activity monitor, a response from the security host manager indicating that the batch of audit records have been stored; and
    return the query results to the client device.

14. The system of claim 13, wherein the security host manager stores the audit records in the batch of audit records in a database associated with the database engine.

15. The system of claim 13, wherein to return the query results to the client device the instructions, when executed, further cause the database service to:
  return the query results to the client device after the response has been received from the security host manager indicating that the batch of audit records have been stored.

16. The system of claim 13, wherein to return the query results to the client device the instructions, when executed, further cause the database service to:
  return the query results to the client device before the response has been received from the security host manager indicating that the batch of audit records have been stored.

17. The system of claim 13, wherein the security host manager outputs an event stream including the audit records to an aggregating service.

18. The system of claim 13, wherein the instructions, when executed, further cause the database service to:
  periodically generate, by the activity monitor, a heartbeat record; and
  store the heartbeat record in the shared memory, wherein the heartbeat record is included in the batch of audit records when it is sent to the security host manager.

19. The system of claim 13, wherein the instructions, when executed, further cause the database service to:
  determine that the shared memory has reached a batch limit;
  prepare the batch of audit records to be sent to the security host manager; and
  update a location in the shared memory with a value indicating processing status.

20. The system of claim 19, wherein the batch limit includes at least one of a time limit, batch size limit, or record number limit.

* * * * *